(12) United States Patent
Atanassov et al.

(10) Patent No.: US 8,994,843 B2
(45) Date of Patent: Mar. 31, 2015

(54) HIGH DYNAMIC RANGE IMAGE SENSOR

(75) Inventors: Kalin M. Atanassov, San Diego, CA (US); Ruben M. Velarde, San Diego, CA (US); Hau Hwang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 853 days.

(21) Appl. No.: 12/873,981

(22) Filed: Sep. 1, 2010

(65) Prior Publication Data

US 2012/0050557 A1    Mar. 1, 2012

(51) Int. Cl.
| | |
|---|---|
| *H04N 5/228* | (2006.01) |
| *H04N 5/355* | (2011.01) |
| *H04N 9/64* | (2006.01) |
| *H04N 5/3745* | (2011.01) |

(52) U.S. Cl.
CPC .......... *H04N 5/35581* (2013.01); *H04N 5/3745* (2013.01)
USPC ........ 348/222.1; 348/284; 348/297; 348/247; 348/311

(58) Field of Classification Search
CPC ............ H04N 5/23232; H04N 5/2355; H04N 5/35536; H04N 1/32267
USPC ............ 348/259, 333.08, 335, 340, 343, 344, 348/369, 362, 229.1, 221.1, 208.12, 222.1, 348/E05.024, 154, 208.1, 208.4, 208.13
See application file for complete search history.

(56) References Cited

U.S. PATENT DOCUMENTS

| | | | |
|---|---|---|---|
| 5,471,515 A | 11/1995 | Fossum et al. | |
| 6,115,065 A | 9/2000 | Yadid-Pecht et al. | |
| 6,798,451 B1 | 9/2004 | Suzuki et al. | |
| 7,019,277 B2 | 3/2006 | Scott-Thomas | |
| 7,259,413 B2 | 8/2007 | Rhodes | |
| 7,301,563 B1* | 11/2007 | Kakinuma et al. | 348/208.13 |
| 2005/0046708 A1* | 3/2005 | Lim et al. | 348/231.6 |
| 2005/0253935 A1* | 11/2005 | Hiramatsu et al. | 348/222.1 |
| 2006/0066750 A1 | 3/2006 | Henderson et al. | |
| 2006/0158542 A1 | 7/2006 | Mizuno et al. | |
| 2006/0177148 A1* | 8/2006 | Sumiya et al. | 382/274 |
| 2006/0181624 A1* | 8/2006 | Krymski | 348/296 |
| 2006/0209204 A1 | 9/2006 | Ward | |

(Continued)

FOREIGN PATENT DOCUMENTS

| | | |
|---|---|---|
| JP | H1023324 A | 1/1998 |
| JP | 2001069408 A | 3/2001 |
| JP | 2002190983 A | 7/2002 |
| JP | 2003219281 A | 7/2003 |

(Continued)

OTHER PUBLICATIONS

International Search Report and Written Opinion—PCT/US2011/050068—ISA/EPO—Sep. 13, 2012.

*Primary Examiner* — Hung Lam
(74) *Attorney, Agent, or Firm* — Michael DeHaemer; James R. Gambale, Jr.

(57) ABSTRACT

This disclosure describes techniques for producing high dynamic range images by applying a variable weighting factor to a sample prior to combining the sample with another sample. In one example, a method includes sampling a first pixel cell signal at a first time to produce a first sample, sampling a second pixel cell signal at a second time to produce a second sample, applying a variable weighting factor to the second sample, wherein the variable weighting factor is defined based on a function, and combining the first sample and the weighted second sample.

32 Claims, 10 Drawing Sheets

(56) References Cited

U.S. PATENT DOCUMENTS

| | | |
|---|---|---|
| 2007/0216789 A1 | 9/2007 | Cernasov et al. |
| 2007/0268396 A1 | 11/2007 | Kurane |
| 2008/0036889 A1* | 2/2008 | Yamada et al. .............. 348/294 |
| 2008/0143841 A1* | 6/2008 | Tico et al. ................ 348/208.99 |
| 2009/0086085 A1* | 4/2009 | Asoma ......................... 348/362 |
| 2009/0109306 A1* | 4/2009 | Shan et al. .................. 348/273 |

FOREIGN PATENT DOCUMENTS

| | | |
|---|---|---|
| JP | 2004266347 A | 9/2004 |
| JP | 2005295336 A | 10/2005 |
| JP | 2008277894 A | 11/2008 |
| KR | 20050022748 A | 3/2005 |
| KR | 20100086987 A | 8/2010 |
| WO | 2008/069015 A1 | 6/2008 |

\* cited by examiner

HIGH DYNAMIC RANGE IMAGE SENSOR

TECHNICAL FIELD

The disclosure relates to image sensors and, in particular, techniques for producing high dynamic range images.

BACKGROUND

The dynamic range of a scene is determined by a ratio of the highest and lowest light levels of the scene. The dynamic range of a sensor is determined by a ratio of the highest light level in a scene that does not saturate the sensor to the lowest light level, i.e., above a noise floor, detectable by the sensor. The dynamic range of a scene may be, for example, 100,000:1, while the dynamic range of a sensor may be, for example, 100:1. When the dynamic range of the scene exceeds the dynamic range of the sensor, details in the regions of highest light levels and lowest light levels are lost.

Exposure may be adjusted in a manner such that the dynamic range of a sensor covers as much useful light level as possible. Exposure cannot increase the dynamic range of the sensor. However, combining two or more different exposures of a scene may permit the capture of a higher dynamic range of the scene then would otherwise be possible by a single exposure.

With respect to combining different exposures to produce an HDR image of a scene, various sensor manufacturers have employed various techniques to overcome the dynamic range capabilities of imaging sensors. Some techniques provide software solutions that align two images of different exposure times in order to form a higher dynamic range image than would otherwise be possible. Other techniques provide hardware solutions, e.g., modified sensors, to capture two images of a scene that will be aligned to form a higher dynamic range image.

SUMMARY

In general, this disclosure describes techniques for producing high dynamic range images by applying a variable weighting factor to a sample prior to combining the sample with another sample. An image sensor may sample a pixel cell signal at two or more different exposure times in order to produce two or more samples that may be combined to produce a high dynamic range image. A long exposure time, however, may cause a photosensitive semiconductor of the pixel cell to become saturated. Prior to combining the two or more samples, a variable weighting factor may be applied to the signal produced by the long exposure time in order to reduce or eliminate the contribution of the saturated photosensitive semiconductor.

In one example, the disclosure is directed to a method comprising sampling a first pixel cell signal at a first time to produce a first sample, sampling a second pixel cell signal at a second time to produce a second sample, applying a variable weighting factor to the second sample, wherein the variable weighting factor is defined based on a function, and combining the first sample and the weighted second sample.

In another example, the disclosure is directed to a system comprising an image sensor comprising a plurality of pixel cells and a controller that samples, from at least one of the plurality of pixel cells, a first pixel cell signal at a first time to produce a first sample and samples, from the at least one of the plurality of cells, a second pixel cell signal at a second time to produce a second sample. The system further comprises a processor that applies a variable weighting factor to the second sample, wherein the variable weighting factor is defined based on a function and combines the first sample and the weighted second sample.

In another example, the disclosure is directed to a system comprising means for sampling a first pixel cell signal at a first time to produce a first sample, means for sampling a second pixel cell signal at a second time to produce a second sample, means for applying a variable weighting factor to the second sample, wherein the variable weighting factor is defined based on a function, and means for combining the first sample and the weighted second sample.

In another example, the disclosure is directed to a computer-readable medium comprising instructions that, when executed by one or more processors, cause the one or more processors to sample a first pixel cell signal at a first time to produce a first sample, sample a second pixel cell signal at a second time to produce a second sample, apply a variable weighting factor to the second sample, wherein the variable weighting factor is defined based on a function, and combine the first sample and the weighted second sample.

The details of one or more examples of the disclosure are set forth in the accompanying drawings and the description below. Other features, objects, and advantages will be apparent from the description and drawings, and from the claims.

DETAILED DESCRIPTION

This disclosure describes techniques for producing high dynamic range (HDR) images, e.g., still images and video images, by applying a variable weighting factor to a sample prior to combining the sample with another sample. A HDR image refers to an image that has a dynamic range, e.g., a ratio of the highest intensity light level relative to the lowest intensity light level in the image, greater than that of image produced by standard imaging techniques. One example HDR imaging technique combines images captured with different exposure times to create a combined image with a greater dynamic range then that of an image produced from either of the exposure times. This disclosure provides techniques that apply a variable weighting factor to one of the images captured with different exposure times prior to combining the images in order to produce a HDR image.

Figure 1:
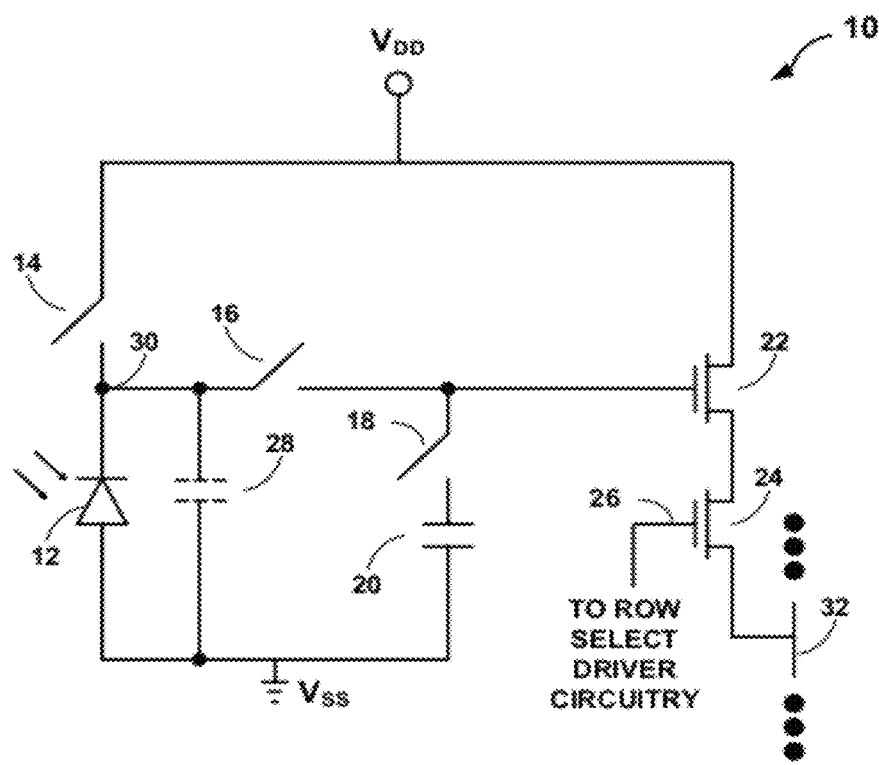
FIG. 1 is a schematic diagram of an example pixel cell that may be used to implement the techniques of this disclosure.

FIG. 1 is a schematic diagram of an example picture element ("pixel") cell that may be used to implement the techniques of this disclosure. In FIG. 1, example pixel cell 10 comprises photosensitive semiconductor 12, switches 14, 16, and 18, capacitor 20, and transistors 22, 24. Switches 14, 16, and 18 may be transistors, for example. A capacitance is associated with photosensitive semiconductor 12, as indicated by equivalent capacitor 28 (shown by dashed lines). The cathode of photosensitive semiconductor 12 is connected to voltage source $V_{DD}$ through switch 14, and the anode of photosensitive semiconductor 12 is connected to reference voltage $V_{SS}$, which may be ground or other potential less than voltage source $V_{DD}$. Thus, photosensitive semiconductor 12 is reverse-biased because its cathode at node 30 is at a higher potential than its anode.

The gate of transistor 22 is connected to the cathode of photosensitive semiconductor 12 through switch 16. The gate of transistor 22 is also connected to capacitor 20 through switch 18. The drain of transistor 22 is connector to voltage source $V_{DD}$, and the source of transistor 22 is connected to the drain of transistor 24. Gate 26 of transistor 24 is connected to row select driver circuitry, as described in more detail below. The source of transistor 24 is connector to pixel cell output line 32.

It should be noted that although transistors 22 and 24 are depicted as enhancement-mode metal-oxide-semiconductor field-effect transistors (MOSFETs) without their respective bulks attached, numerous other configurations are possible. In addition, although transistors 22 and 24 are described below as n-MOS type transistors, in other example configurations, transistors 22 and 24 may be p-MOS type transistors.

Photosensitive semiconductor 12, e.g., a photodiode, is a device that converts photons from incident light into electrical charge. During a time period in which photosensitive semiconductor 12 is exposed to light, i.e., the integration time, photons from the incident light cause the photosensitive semiconductor to generate charge carriers within a region of the photosensitive semiconductor. The amount of charge carriers generated is proportional to the amount of incident light. As light intensity increases, the amount of charge carriers generated increases. The photosensitive semiconductor may become "saturated" if the amount of charge carriers can no longer increase as the amount of incident light increases. It should be appreciated that once a photosensitive semiconductor becomes saturated, it is no longer an accurate indicator of the amount of incident light. As such, the saturated photosensitive semiconductor has little information of value.

As mentioned above and as shown at reference number 28 in FIG. 1, photosensitive semiconductor 12, e.g., a photodiode, has an equivalent capacitance. Prior to exposure to light, pixel cell 10 may be reset to an initial voltage. In particular, photosensitive semiconductor 12 and its equivalent capacitance 28, may be reset to an initial voltage of $V_{DD}$, for example. In the example depicted in FIG. 1, reset switch 14 may be closed in order to reset pixel cell 10 of FIG. 1. Closing reset switch 14 connects node 30 and, in particular, photosensitive semiconductor 12 and its equivalent capacitor 28, to supply voltage $V_{DD}$. Although FIG. 1 depicts pixel cell 10 being reset to supply voltage $V_{DD}$, in other examples, pixel cell 10 may include a second voltage, similar to or different from supply voltage $V_{DD}$ that acts as a dedicated reset voltage for pixel cell 10. Closing reset switch 14 drains charge out of photosensitive semiconductor 12 and charges equivalent capacitor 28 to known voltage $V_{DD}$. In addition, switches 16 and 18 are closed at reset, which can cause capacitor 20 to become charged to known voltage $V_{DD}$.

After pixel cell 10 is reset, reset switch 14 and switches 16 and 18 are opened and photosensitive semiconductor 12 begins converting photons to charge upon exposure to light. Upon exposure to light, i.e., at the beginning of its integration time, photosensitive semiconductor 12 begins generating charge carriers. Because photosensitive semiconductor 12 is reverse-biased, photocurrent will begin to flow from the cathode to the anode of photosensitive semiconductor 12. The photocurrent is proportional to the amount of incident light. As light intensity increases, the amount of charge carriers generated by photosensitive semiconductor 12 increases, thereby increasing the photocurrent. The photocurrent begins to discharge equivalent capacitor 28.

Pixel cell 10 may be used to sample a first pixel cell signal at a first time, e.g., a short exposure time, and a second pixel cell signal at a second time, e.g., a long exposure time. After a short exposure time, e.g. $T_{short}$, pixel cell 10 may sample a first signal from photosensitive semiconductor 12 by closing switches 16 and 18. A controller (e.g., controller 54 of FIG. 3) closes switches 16 and 18 to transfer the short exposure time charge from photosensitive semiconductor 12 and, in particular, its equivalent capacitor 28, to capacitor 20. After a time sufficient to complete the transfer of charge from photosensitive semiconductor 12 to capacitor 20, a controller (e.g., controller 54 of FIG. 3) opens switches 16 and 18, thus capturing via capacitor 20 a voltage representing the amount of light incident upon photosensitive semiconductor 12 during time $T_{short}$. In this manner, capacitor 20 collects a short exposure time sample.

In the meantime, light may continue to strike photosensitive semiconductor 12. Incident light may continue to generate charge carriers in photosensitive semiconductor 12, thereby further discharging equivalent capacitor 28. After a long exposure time, e.g., $T_{long}$ where $T_{long} > T_{short}$, a long exposure time sample is represented by the voltage remaining on equivalent capacitor 28. At this point, the long exposure time sample may be read out by closing switch 16 and applying a row select signal to gate 26 of transistor 24 (described in more detail below). A controller (e.g., controller 54 of FIG. 3) closes switch 16 and applies a row select signal to gate 26 of transistor 24 to turn on transistors 22 and 24. A voltage representing the long exposure time sample is then read out from pixel cell 10 and, in particular, equivalent capacitor 28, via line 32 through transistors 22 and 24.

After the long exposure time sample is read out, the short exposure time sample stored in capacitor 20 may be read out. The short exposure time sample may be read out by opening switch 16, closing switch 18, and applying a row select signal to gate 26 of transistor 24. Closing switch 18 and applying a row select signal to gate 26 of transistor 24 turns on transistors 22 and 24. The voltage stored on capacitor 30, which represents the short exposure time sample, is then read out from pixel cell 10 via line 32. The voltage that is read out is approximately equal to the voltage across capacitor 30 minus the threshold voltages of transistors 22 and 24.

In some implementations, e.g., implementations that use complimentary MOS (CMOS) image sensors, it may be desirable to perform correlated double sampling. Some types of noise, e.g., fixed pattern noise (FPN), may be reduced or eliminated by using correlated double sampling. That is, because photosensitive semiconductors throughout an array are not identical, correlated double sampling may be used to reduce or eliminate the non-uniformity across the photosensitive semiconductors in an array. A controller (for example, controller 54 of FIG. 3) on the image sensor may perform correlated double sampling by closing switch 14, thereby resetting pixel cell 10 to reference voltage $V_{DD}$, and then sampling the output level of the pixel cell after the pixel cell has been reset. That is, after the pixel cell value has been read out, the controller may reset, sample, and read out the reset value of a pixel cell, e.g. pixel cell 10. Then, the controller may subtract the pixel cell's reset value from the value of the signal sample in order to provide a more accurate representation of the signal.

In accordance with the techniques of this disclosure, the short exposure time sample and the long exposure time sample may be combined by a processor after applying a variable weighting factor to the long exposure time sample. By applying a variable weighting factor that is defined by a function at the value of the long exposure time sample, the dynamic range provided by the two different exposure times may be improved. In particular, if a pixel cell is saturated after the long exposure time, then the contribution of the long exposure time sample may be reduced or eliminated by the weighting factor during the combination of the short exposure time sample and the long exposure time sample. As mentioned above, if a photosensitive semiconductor becomes saturated, it is no longer an accurate indicator of the amount of incident light. As such, the saturated photosensitive semiconductor has little information of value. During the short exposure time, however, a pixel cell is unlikely to saturate. Hence, the short exposure time sample likely has more valuable information than the saturated, or overexposed, long exposure time sample.

In order to reduce or eliminate the contribution of the long exposure time sample during the combination of the long exposure time sample and the short exposure time sample, the following combining scheme may be used:

$$M(i,j) = C(S_{LONG}(i,j)) \quad (1)$$

$$S_{COMBINED}(i,j) = S_{LONG}(i,j)*M(i,j) + n*S_{SHORT}(i+H(i,j), j+V(i,j))*(1-M(i,j))$$

where $S_{COMBINED}$ is the combination of the short exposure time sample $S_{SHORT}(i, j)$ and the long exposure time sample $S_{LONG}(i, j)$ for the pixel cell located at (i, j), C( ) is a combining curve that begins at a value of one and decreases to a value of zero as long exposure time sample $S_{LONG}(i, j)$ becomes saturated, M(i, j) is a scalar value of the long exposure time sample $S_{LONG}(i, j)$ weighted by C( ), n is scalar value that is dependent on the difference in the time of exposure between the short exposure time ($T_{SHORT}$) and the long exposure time ($T_{LONG}$) and is equal to $T_{LONG}/T_{SHORT}$, and H(i, j) and V(i, j) are horizontal and vertical alignment variables, respectively, which may be necessary to compensate for camera motion and/or objection motion in implementations in which the two exposures are taken sequentially.

In example implementations in which the two exposures are taken continuously rather than sequentially, H(i, j) and V(i, j) are equal to zero and equation (2) above may be reduced to the following:

$$S_{COMBINED}(i,j) = S_{LONG}(i,j)*M(i,j) + n*S_{SHORT}(i,j)*(1-M(i,j)) \quad (3)$$

As mentioned above, the long exposure time sample $S_{LONG}(i, j)$ in equations (2) and (3) may be modified by the scalar value n. The scalar value n may comprise the ratio of the short exposure time and the long exposure time. The scalar value n may be used in order to normalize the long exposure time sample $S_{LONG}(i, j)$ and the short exposure time sample $S_{SHORT}(i, j)$ by bringing the two samples to a common base.

In other words, the combining scheme described by equations (2) and (3) adjusts the value n so that objects appear at the same level in both images prior to their combination. For example, assume that one half of a frame of a scene has a luminance value of 100 lux and the other half has a luminance value of 1000 lux. The frame has a luminance ratio of 10:1. Further assume that $S_{SHORT}$ corresponds to the 1000 lux portion of the frame, $S_{LONG}$ corresponds to the 100 lux portion of the frame, the long exposure time $T_{LONG}$ equals one second, and the short exposure time $T_{SHORT}$ equals 0.1 seconds. In order to combine the two different exposure time samples, the short exposure time sample of 1000 lux must be scaled downward to the long exposure time sample of 100 lux. A processor (e.g., processor 76 of FIG. 3) may multiply the short exposure time sample $S_{SHORT}$ by the ratio of exposure times, e.g., $T_{LONG}/T_{SHORT}$, to normalize the short exposure time sample $S_{SHORT}$ in order to account for the difference in exposure time.

In addition to saturation, the "noise floor" of the pixel cell, i.e., the low-level signal produced by pixel cells in the absence of incident light, is a factor in reducing dynamic range. In light of the noise floor, the short exposure time sample $S_{SHORT}(i, j)$ and long exposure time sample $S_{LONG}(i, j)$ may be combined in a signal-to-noise (SNR) efficient manner. That is, if a sample has a value below the SNR of the pixel cell itself, the sample may be discarded.

Figure 2:
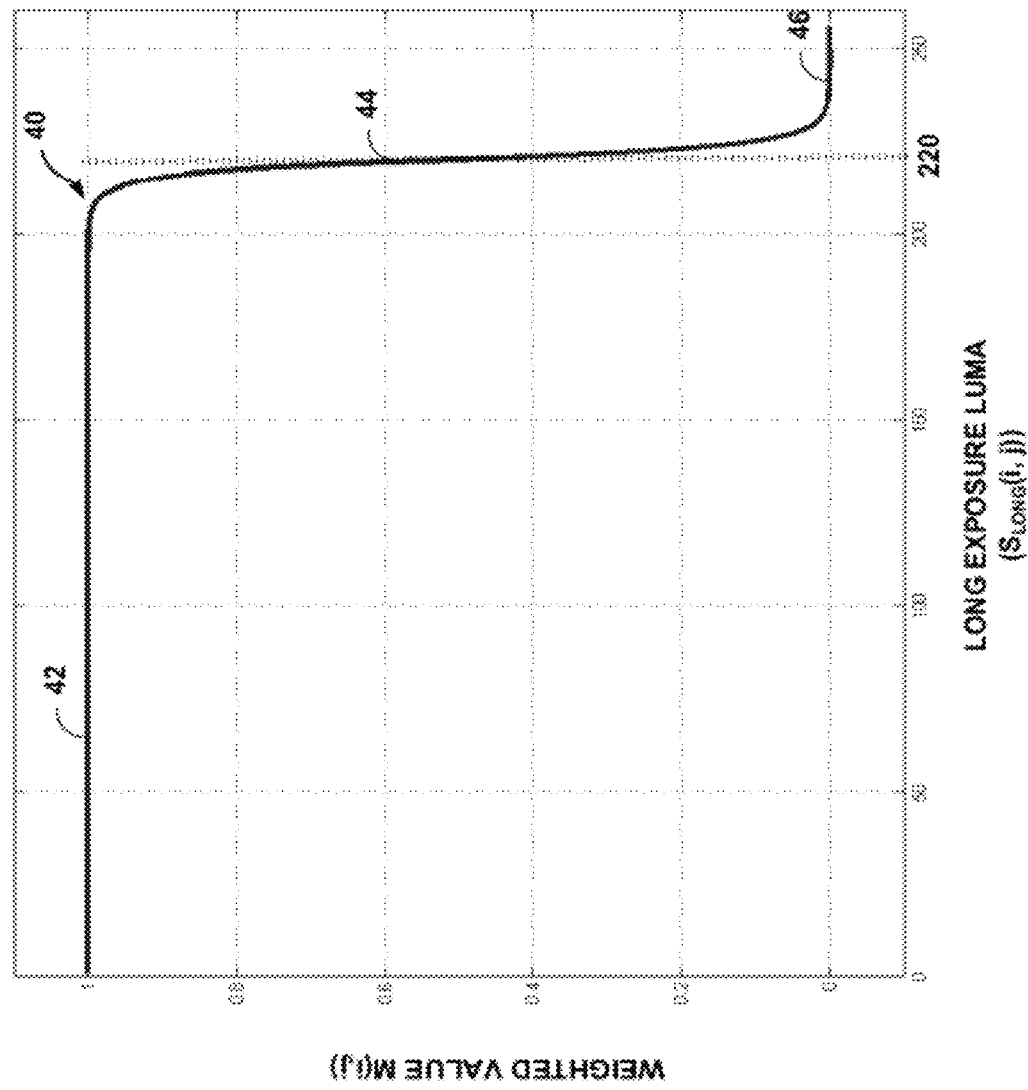
FIG. 2 is an example graph of a combing curve that may be used in a combining scheme in accordance with the techniques of this disclosure.

FIG. 2 is an example graph of a combining curve, namely C ( ) that may be used in a combining scheme in accordance with the techniques of this disclosure. The x-axis of the graph depicted in FIG. 2 represents the luma value of the pixel cell located at a spatial location (i, j) on the pixel cell array after a long exposure time. The y-axis of the graph depicted in FIG. 2 represents the weighted value, M(i, j), of $S_{LONG}(i, j)$ as defined by combining curve C( ) shown generally at 40.

If the pixel cell located at (i, j) is not exposed to light during a long exposure time, then the value of $S_{LONG}(i, j)$ is zero. If the pixel cell located at (i, j) is saturated after a long exposure time, then the value of $S_{LONG}(i, j)$ is at a maximum, e.g., 255 for an eight-bit implementation. As seen in FIG. 2, as the value of $S_{LONG}(i, j)$ increases, the value of M(i, j) remains at a value of "1" until an $S_{LONG}(i, j)$ value of about 210. The combining curve C( ) begins to decrease sharply between the $S_{LONG}(i, j)$ values of about 210 and about 230 until the weighted value M(i, j) reaches a value of "0" at an $S_{LONG}(i, j)$ value of about 230. Between the $S_{LONG}(i, j)$ values of about 210 and about 230, the weighted value M(i, j) may be a value between "0" and "1." For example, at an $S_{LONG}(i, j)$ value of about 220, the weighted value M(i, j) is about 0.5.

As one example, if the pixel cell located at (i, j) is saturated, then $S_{LONG}(i, j)=255$ (for eight-bit implementations) and $M(i, j)=C(S_{LONG}(i, j))=C(255)=0$. Referring to equation (3), $S_{COMBINED}(i, j)=n*S_{LONG}(i, j)*0+S_{SHORT}(i, j)*(1)=S_{SHORT}(i, j)$. Thus, using the combination scheme described above, the contribution of the saturated sample $S_{LONG}(i, j)$ may be completely removed from the combined value $S_{COMBINED}(i, j)$.

As seen in equations (2) and (3), combined result $S_{COMBINED}(i, j)$ is weighted based on the saturation level of $S_{LONG}(i, j)$. If the pixel cell located at (i, j) is completely saturated after the long exposure time, then M(i, j)=0, and $S_{LONG}(i, j)$ has no influence on combined result $S_{COMBINED}(i, j)$. As mentioned above, a saturated pixel cell has little information of value and may be removed from combined result $S_{COMBINED}(i, j)$ in order to fully exploit the benefits of the dynamic range increase provided by the two different exposure time samples, namely $S_{SHORT}(i, j)$ and $S_{LONG}(i, j)$. If the pixel cell located at (i, j) is not close to saturation after the long exposure time, e.g., $S_{LONG}(i, j)$ is less than about 200 in FIG. 2, then $M(i, j)=1$, and only the long exposure time sample $S_{LONG}(i, j)$ has influence.

The example combining curve C ( ) depicted at 40 in FIG. 2 includes three segments, 42, 44 and 46. In other examples, combining curve C ( ) may have more, or fewer segments. As seen in FIG. 2, combining curve C ( ) may generally be considered a decaying function as the value of the long exposure time sample $S_{LONG}(i, j)$ increases. In other examples, combining curve C ( ) may decay less sharply.

Two extreme conditions, corresponding to segment 42 where $M(i, j)=1$ and segment 46 where $M(i, j)=0$, were described above. At these two extremes, the contribution of $S_{LONG}(i, j)$ or $S_{SHORT}(i, j)$, respectively, is completely removed from combined value $S_{COMBINED}(i, j)$. If, however, the value of long exposure time sample $S_{LONG}(i, j)$ corresponds to segment 44, then $0<M(i, j)<1$. Hence, combined value $S_{COMBINED}(i, j)$ will include contributions of both long exposure time sample $S_{LONG}(i, j)$ and short exposure time sample $S_{SHORT}(i, j)$. As seen in FIG. 2, as the value of long exposure time sample $S_{LONG}(i, j)$ increases, the weighted value $M(i, j)$ decreases and, in accordance with equations (2) and (3), the contribution of long exposure time sample $S_{LONG}(i, j)$ to combined value $S_{COMBINED}(i, j)$ decreases.

By using a variable weighting function in the combining scheme described in this disclosure, such as function C ( ) depicted in FIG. 2, the dynamic range of the sensor can be made variable and programmable. Every pixel cell may have a different weighted value $M(i,j)$ that varies according to the value of the long exposure time sample value $S_{LONG}(i, j)$ for that particular pixel cell. Unlike other image sensors in which the dynamic range of the sensor is fixed based upon values of capacitors used to construct the sensor, using the techniques of this disclosure the dynamic range is adaptable, e.g., for a particular scene. For example, it may be desirable to set a digital camera to have four f-stops (f-stops are a measure of dynamic range for digital cameras) for a particular scene. The exposure times may be adjusted to provide four f-stops, and then the two samples from the two exposure times may be combined.

As mentioned above, numerous combining curves may be used to combine images of different exposure times, and as such, the disclosure is not limited to the combining curve depicted in FIG. 2, or to the description above. In one example, a combining curve may be generated according to one or more of the following three guidelines. First, the combining curve may be image level dependent. Any of the two images may be used with comparable results but the two curves will differ. Second, the combining curve may weight less noisy images more heavily than more noisy images. For example, the long exposure time sample, $S_{LONG}$, which likely has less noise than short exposure time sample $S_{SHORT}(i, j)$, may be weighted more heavily than $S_{SHORT}$. In some examples, however, equal gain combining may be used, rather than weighted one image more heavily than another. Third, the combining curve may be monotonically decreasing.

There are several combining methodologies that may satisfy the above guidelines based on how much is known beforehand about the image noise statistics. In a first example methodology, selection combining for which the curve is either 0 or 1 may be used. The rational is that the long exposure time image may be used entirely if the long exposure image level is not close to saturation, and the short exposure time image may be used entirely if long exposure image is close to saturation.

In a second example combining methodology, prior knowledge may be used to model noise statistics based on the image level and utilize maximum ratio combining where each image is scaled inversely proportional to its noise levels. In such an example, an enhanced version of the first example methodology may be used for which the transition from 1 to 0 is made more gradual. One combining curve C(L) may be generated using the following:

$$C(L) = \begin{cases} 1 & \text{if } L < T - \Delta \\ (1 - e^{K(L-T)/\Delta})/2 + 0.5 & \text{if } T - \Delta \leq L < T \\ (e^{K(T-L)/\Delta})/2 & \text{if } T \leq L \leq T + \Delta \\ 0 & \text{if } L > T + \Delta \end{cases} \quad (4)$$

where L is the luma value associated with $S_{LONG}(i, j)$, e.g., a combination of R, G, B components like (R+G+B)/2, max(R, G,B), or the like and having a value of 0-255 in an 8-bit implementation, where T is a threshold value in the range of the luma value (e.g., T=220 in the example curve shown in FIG. 2) that controls a transition point of the combining curve, where $\Delta$ is a range within the range of L that controls a transition range of the combining curve (e.g., $\Delta=30$ in the example curve shown in FIG. 2), and where K is a number that controls the slope of the transition region of the combining curve (e.g., K=10 in the example curve shown in FIG. 2).

It should be noted that a particular scene might require minimal dynamic range. Using the techniques of this disclosure, the dynamic range of the imaging sensor may be reduced to improve the noise characteristics of the sensor. Collecting and combining two samples of approximately equal exposure times, i.e., $T_{LONG}$ is approximately equal to $T_{SHORT}$, may reduce noise. When combined, the noise can be averaged between the two samples, and thus may be significantly reduced.

Figure 3:
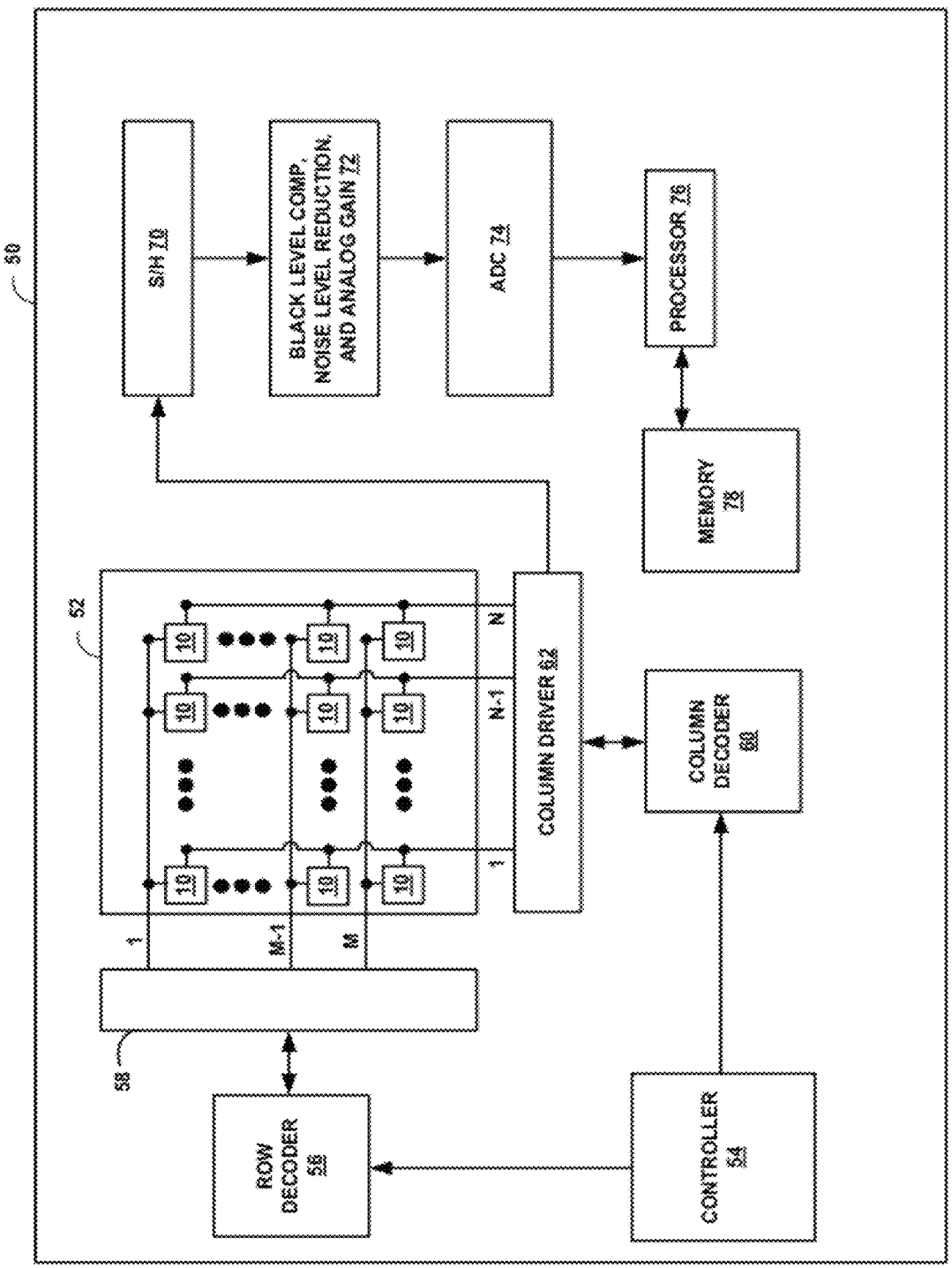
FIG. 3 is a block diagram of an image sensor that may be used to implement the techniques of this disclosure.

FIG. 3 is a block diagram of an example image sensor that may be used to implement the techniques of this disclosure. Although image sensor 50 of FIG. 3 is a complimentary MOS (CMOS) image sensor, the signal combining techniques described in this disclosure are applicable to other image sensors as well, including, for example, charge-coupled device (CCD) image sensors.

As seen in FIG. 3, image sensor 50 includes pixel cell array 52 comprising numerous pixel cells 10. Pixel cell array 52 may be arranged in M rows and N columns of pixel cells 10, as shown in FIG. 3. Each pixel cell 10 of pixel cell array 52 may be addressed by a row and column address. For example, in order to access the pixel cell located in the bottom left-hand corner of pixel cell array 52 (row M, column N), controller 54 provides row address decoder 56 with a digital address of the row of the desired pixel cell, e.g., row M. Row address decoder 56 decodes the received row address and outputs a "row select" signal to row driver 58 to apply a voltage to row M, thereby selecting each pixel cell 10 in row M, e.g., by applying a voltage on gate 26 of transistor 24 in FIG. 1. Controller 54 also provides column address decoder 60 with a digital address of the column of the desired pixel cell, e.g., column N. Column address decoder 60 decodes the received column address and outputs a "column select" signal to column diver 62 to apply a voltage to column N, thereby selecting each pixel cell 10 in column N. In this manner, pixel cell 10 at row M, column N may be selected and its voltage read out. Controller 54 may include one or more microprocessors, digital signal processors (DSPs), application specific integrated circuits (ASICs), field programmable gate arrays (FP- GAs), discrete logic, or other processor arrangements suitable for processing computer code to facilitate the execution of the functions described in this disclosure.

Upon being read out by controller 54, the voltage of pixel cell 10 at row M, column N, for example, is sampled and held by sample and hold (S/H) circuitry 70. Processing such as black level compensation, noise reduction, e.g., temporal noise and FPN, and amplification is performed on analog signals by processing circuitry 72.

After the analog signals have been black level compensated, noise reduced, and amplified via processing circuitry 72, the analog signals from pixel cells 10 are quantized to digital values via analog-to-digital converter (ADC) 74. The digital values are then input into processor 76. Processor 76 may combine, for each pixel cell, the short exposure time sample $S_{SHORT}$ and the long exposure time sample $S_{LONG}$, in accordance with the techniques described in this disclosure, with particular reference to equations (1)-(3) above.

In some examples, processor 76 may execute instructions in order to perform the functions described in this disclosure. The instructions may be stored in memory 78. Processor 76 may include one or more microprocessors, digital signal processors (DSPs), application specific integrated circuits (ASICs), field programmable gate arrays (FPGAs), discrete logic, or other processor arrangements suitable for processing computer code to facilitate the execution of the functions described in this disclosure. The executable instructions stored in memory 78 may comprise computer-readable instructions encoded in a computer-readable medium such as random access memory (RAM), synchronous dynamic random access memory (SDRAM), read-only memory (ROM), non-volatile random access memory (NVRAM), electrically erasable programmable read-only memory (EEPROM), FLASH memory, magnetic or optical data storage media, and the like.

Continuing with the example above, processor 76 receives the digitized pixel cell values for pixel cell 10 at row M, column N. In particular, processor 76 receives a digital value for long exposure time sample $S_{LONG}(m, n)$ and a digital value for short exposure time sample $S_{SHORT}(m, n)$ from pixel cell (m, n). In accordance with the techniques of this disclosure, processor 76 may combine long exposure time sample $S_{LONG}(m, n)$ and a digital value for short exposure time sample $S_{SHORT}(m, n)$ from pixel cell (m, n).

Processor 76 may calculate, obtain, or otherwise acquire variable weighting factor M(m, n) for long exposure time sample $S_{LONG}(m, n)$, where M(m,n) is determined by evaluating C( ) at $S_{LONG}(m, n)$, or $C(S_{LONG}(m, n))$. In one example, combining curve C( ) may be defined by one or more equations. Each equation defining a combining curve C( ) may, for example, be dependent upon the desired dynamic range, e.g., f-stop value. For example, a user may have selected a certain f-stop value to achieve a desired dynamic range, which in turn corresponds to a specific combining curve C( ) that may be retrieved from memory 78.

Using the received digital value of long exposure time sample $S_{LONG}(m,n)$, processor 76 may determine the value of variable weighting factor M(m, n) by evaluating a particular equation that defines combining curve C ( ) e.g., retrieved from memory 78, for the desired dynamic range at the value of $S_{LONG}(m, n)$. For example, assume that the pixel cell 10 was saturated at long exposure time sample $S_{LONG}(m, n)$. Regardless of the number of bits in the implementation, if the combining curve depicted in FIG. 2 is used by processor 76, then the resulting variable weighting factor M(m, n) is zero.

Processor 76 may, upon determining the variable weighting factor M(m, n), in accordance with the techniques described in this disclosure, combine the short exposure time sample, $S_{SHORT}(m, n)$ and the long exposure time sample, $S_{LONG}(m, n)$ after applying variable weighting factor M(m, n) in accordance with equations (2)-(3) above. Assuming, for example, that the exposures are taken continuously rather than sequentially, equation (3) may be used: $S_{COMBINED}(i, j)=S_{LONG}(i, j)*M(i, j)+n*S_{SHORT}(i, j)*(1-M(i, j))$. Again, because pixel cell 10 becomes saturated at long exposure time sample $S_{LONG}(m, n)$, variable weighting factor M(m, n) is zero, as determined by evaluating combining curve C ( ) or an equation defining combining curve C ( ) at long exposure time sample, $S_{LONG}(m, n)$. Thus, $S_{COMBINED}(m, n)=S_{LONG}(m, n)*0+n*S_{SHORT}(m, n)*(1)=n*S_{SHORT}(m, n)$. In other words, if a pixel cell is saturated, the combined value $S_{COMBINED}$ is simply the value of the short exposure time sample, $S_{SHORT}$, adjusted by the ratio of the two exposure times ($T_{LONG}/T_{SHORT}$).

As another example, assume that the pixel cell 10 does not become saturated at long exposure time sample $S_{LONG}(m, n)$ but instead long exposure time sample $S_{LONG}(m, n)$ had a value of 10. If the combining curve depicted in FIG. 2 is used by processor 76, then the resulting variable weighting factor M(m, n) is one, as seen by the fact that a value of 10 for $S_{LONG}(m, n)$ corresponds to segment 42 of combining curve C ( ).

Processor 76, upon determining the variable weighting factor M(m, n), combines the short exposure time sample, $S_{SHORT}(m, n)$ and the long exposure time sample, $S_{LONG}(m, n)$ after applying variable weighting factor M(m, n). Assuming again that the exposures are taken continuously rather than sequentially, equation (3) may be used: $S_{COMBINED}(i, j)=S_{LONG}(i, j)*M(i, j)+n*S_{SHORT}(i, j)*(1-M(i, j))$. Variable weighting factor M(m, n) has a value of "1," as determined by evaluating combining curve C ( ), or an equation defining combining curve C ( ) at long exposure time sample $S_{LONG}(m, n)$. Thus, $S_{COMBINED}(m, n)=S_{LONG}(m, n)*1+n*S_{SHORT}(i, j)*0$. In other words, the combined value $S_{COMBINED}$ is the value of the long exposure time sample, $S_{LONG}$, which likely has less noise than short exposure time sample $S_{SHORT}(i, j)$.

As another example, assume that the pixel cell 10 was not saturated at long exposure time sample $S_{LONG}(m, n)$ and, instead, long exposure time sample $S_{LONG}(m, n)$ had a luma value of 220 for an 8-bit implementation. If the combining curve depicted in FIG. 2 is used by processor 76, then the resulting variable weighting factor M(m, n) is 0.5, as seen by the fact that a luma value of 220 for $S_{LONG}(m, n)$ intersects combining curve C ( ) in in segment 44 at a variable weighting factor M(m, n) value of 0.5.

Processor 76, upon determining the variable weighting factor M(m, n), combines the short exposure time sample, $S_{SHORT}(m, n)$ and the long exposure time sample, $S_{LONG}(m, n)$ after applying variable weighting factor M(m, n). Assuming again that the exposures are taken continuously rather than sequentially, equation (3) may be used: $S_{COMBINED}(i, j)=S_{LONG}(i, j)*M(i, j)+n*S_{SHORT}(i, j)*(1-M(i, j))$. The variable weighting factor M(m, n) may be 0.5, as determined by evaluating combining curve C ( ), or an equation defining combining curve C ( ) at long exposure time sample, $S_{LONG}(m, n)$. Thus, $S_{COMBINED}(m, n)=S_{LONG}(m, n)*0.5+n*S_{SHORT}(i, j)*0.5$. In other words, the combined value $S_{COMBINED}$ is truly a combination of the both the long exposure time sample and the short exposure time sample because a portion of both samples is used to calculate combined value $S_{COMBINED}$.

In other example implementations, each combining curve C ( ) may be stored in memory, e.g., memory 78, in the form of one or more lookup tables. In such an implementation, processor 76 may access a particular lookup table corresponding to a specific combining curve C ( ) stored in memory 78 and, for a given value of $S_{LONG}(i, j)$, retrieve the value of variable weighting factor M(i, j).

Figure 4:
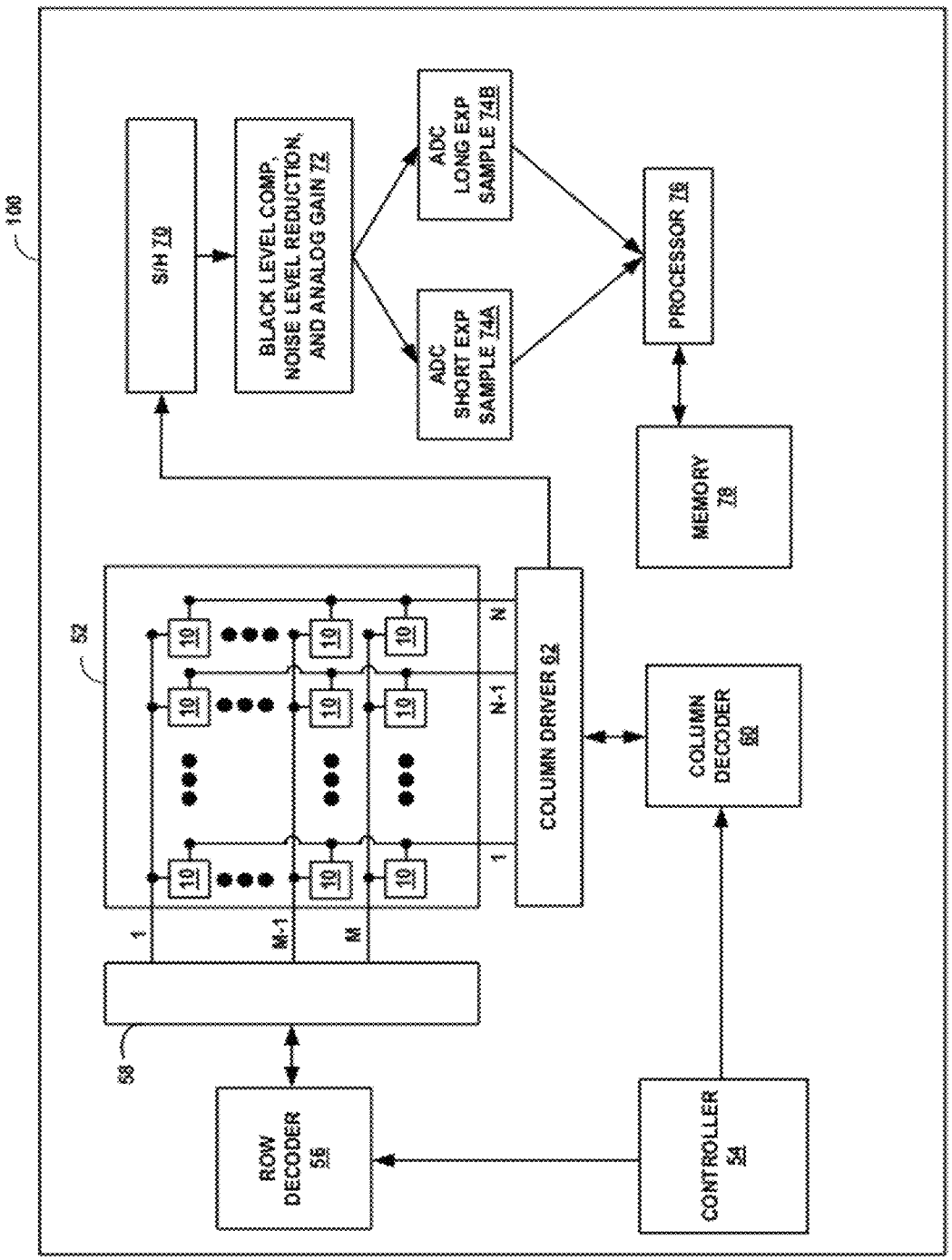
FIG. 4 is a block diagram of another image sensor that may be used to implement the techniques of this disclosure.

FIG. 4 is a block diagram of another image sensor that may be used to implement the techniques of this disclosure. Some aspects of the example image sensor 100 depicted in FIG. 4 are similar to the image sensor depicted in FIG. 3 and will not be described in detail again. In contrast to FIG. 3, FIG. 4 depicts two ADCs 74A, 74B. For simplicity, ADC 74 of FIG. 3 is represented in FIG. 4 as 74A and 74B. ADC 74A is a dedicated ADC for converting short exposure time sample $S_{SHORT}(i, j)$ and ADC 74B is a dedicated ADC for converting long exposure time sample $S_{LONG}(i, j)$. Following the conversion of short exposure time sample $S_{SHORT}(i, j)$ and long exposure time sample $S_{LONG}(i, j)$ by ADC 76A and ADC 76B, respectively, the outputs of ADC 74A and ADC 74B are input into processor 76. Upon receiving the converted samples, processor 76 combines the samples in accordance with the techniques described above with particular reference to equations (1)-(3).

An example image sensor configuration that uses two ADCs, as shown in FIG. 4, may be useful for implementing the techniques of this disclosure because, as described in detail above, two samples, namely short exposure time sample $S_{SHORT}(i, j)$ and long exposure time sample $S_{LONG}(i, j)$ are read out for each pixel cell. An image sensor configuration with parallel ADCs, one for converting short exposure time samples and another for converting long exposure time samples, may improve throughput by allowing the short exposure time sample and the long exposure time sample for each pixel cell to be converted substantially simultaneously. Although the example image sensor configuration of FIG. 4 may require additional circuitry as compared to the image sensor configuration depicted in FIG. 3, such additional circuitry may, in some implementations, e.g., CMOS backside illumination configurations, be added behind the pixel cell without interfering with the light capturing surface area of the pixel cell. In other words, the additional circuitry will not reduce the pixel cell's fill factor, i.e., the area of the photosensitive semiconductor relative to the area of the pixel cell.

Figure 5:
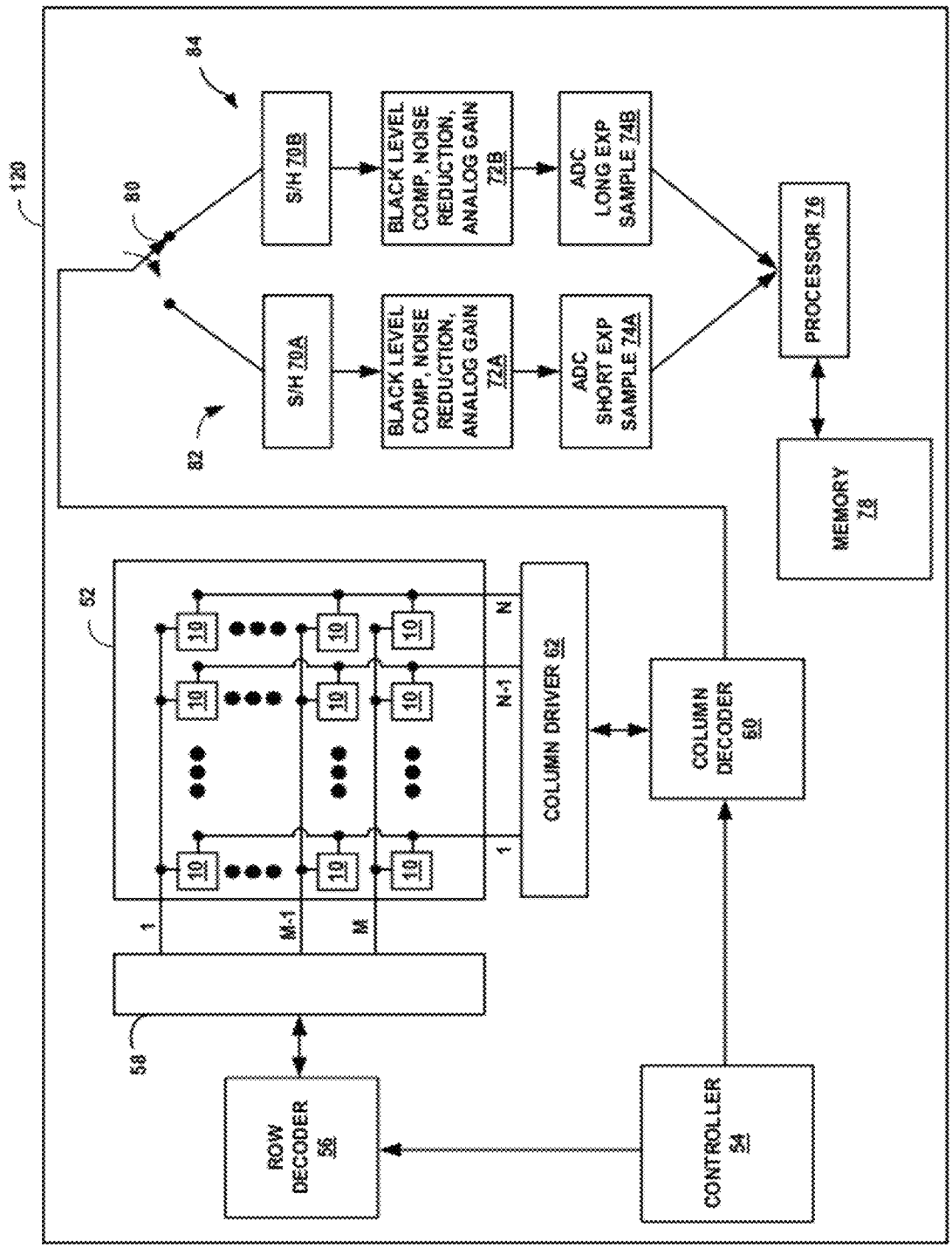
FIG. 5 is a block diagram of another image sensor that may be used to implement the techniques of this disclosure.

FIG. 5 is a block diagram of another image sensor that may be used to implement the techniques of this disclosure. Some aspects of the example image sensor 120 depicted in FIG. 5 are similar to the image sensor depicted in FIG. 3 and will not be described in detail again. The image sensor in FIG. 5 is similar to the image sensor in FIG. 4 in that two ADCs, one for converting short exposure time sample $S_{SHORT}(i, j)$ and another for converting long exposure time sample $S_{LONG}(i,j)$, are used in parallel, which may improve the throughput to processor 76. In addition to parallel ADCs 74A and 74B, the example configuration depicted in FIG. 5 further includes parallel sample and hold circuitry (70A and 70B) and parallel black level compensation, noise reduction, and amplification circuitry (72A and 72B), which may, in some instances, further improve signal throughput to processor 76. The configuration depicted in FIG. 5 includes switch 80 for directing short exposure time sample $S_{SHORT}(i, j)$ for processing through the circuitry generally indicated at 82, and directing long exposure time sample $S_{LONG}(i,j)$ for processing through the circuitry generally indicated at 84. Following the conversion of short exposure time sample $S_{SHORT}(i, j)$ and long exposure time sample $S_{LONG}(i,j)$ by ADC 74A and ADC 74B, respectively, the outputs of ADC 74A and ADC 74B are input into processor 76. Upon receiving the converted samples, processor 76 combines the samples in accordance with the techniques described above with particular reference to equations (1)-(3).

It should be noted that, for simplicity, the techniques of this disclosure have been described above with respect to combining only two samples, a short exposure time sample $S_{SHORT}(i, j)$ and a long exposure time sample $S_{LONG}(i, j)$. However, the techniques of this disclosure are not so limited. Rather, the combination scheme described in this disclosure may be used to combine more than two, e.g., five, samples from different exposure times. For example, in order to take a picture of a very bright object, e.g., the sun, a wide dynamic range would be required. As such, more than two images may be necessary in order to achieve that dynamic range. To that end, multiple samples may be collected and combined using the variable weighting techniques described above.

The combining scheme described throughout this disclosure may be implemented using a variety of imaging techniques to produce a HDR image. In one example technique, the even-numbered lines of a pixel cell array, e.g., pixel cell array 52 of FIG. 3, may be exposed for a first exposure time, e.g., time=t/2, and the odd-numbered lines of the pixel cell array may be exposed for a second exposure time different from the first exposure time, e.g., time=2t. The two different exposures times may be aligned so that they finish at the same time, e.g., substantially simultaneously. Then, the two exposures may be combined to produce an image that is two vertically downsampled images.

Continuing the example above, the odd and even lines of the pixel cell array may be constructed and arranged such that they may be independently controlled. The image may be downsampled or upsampled in order to generate a value for each spatial location on the pixel cell array for the two different exposures times. For example, although only even-numbered lines are exposed for the first exposure time, and thus only first exposure time samples are collected for the even-numbered lines, first exposure time samples may be generated for each of the photosensitive semiconductors on the odd-numbered lines by downsampling or upsampling the samples collected for the even-numbered lines. Similarly, although only odd-numbered lines are exposed for the second exposure time, and thus only second exposure time samples are collected for the odd-numbered lines, second exposure time samples are generated for each of the photosensitive semiconductors on the even-numbered lines by downsampling or upsampling the samples collected for the odd-numbered lines. Thus, the first exposure time sample for each of the plurality of spatial locations in each of the plurality of odd-numbered lines are generated by one of downsampling and upsampling the samples collected from the even-numbered lines over the first exposure time, and the second exposure time sample for each of the plurality of spatial locations in each of the plurality of even-numbered lines are generated by one of downsampling and upsampling the samples collected from the odd-numbered lines over the second exposure time. Using the techniques described throughout the disclosure, the short exposure time samples and long exposure time samples are combined, e.g., using equations (1)-(3). The combination of these samples may produce either a half resolution image or full resolution image that has been upsampled.

Figure 6:
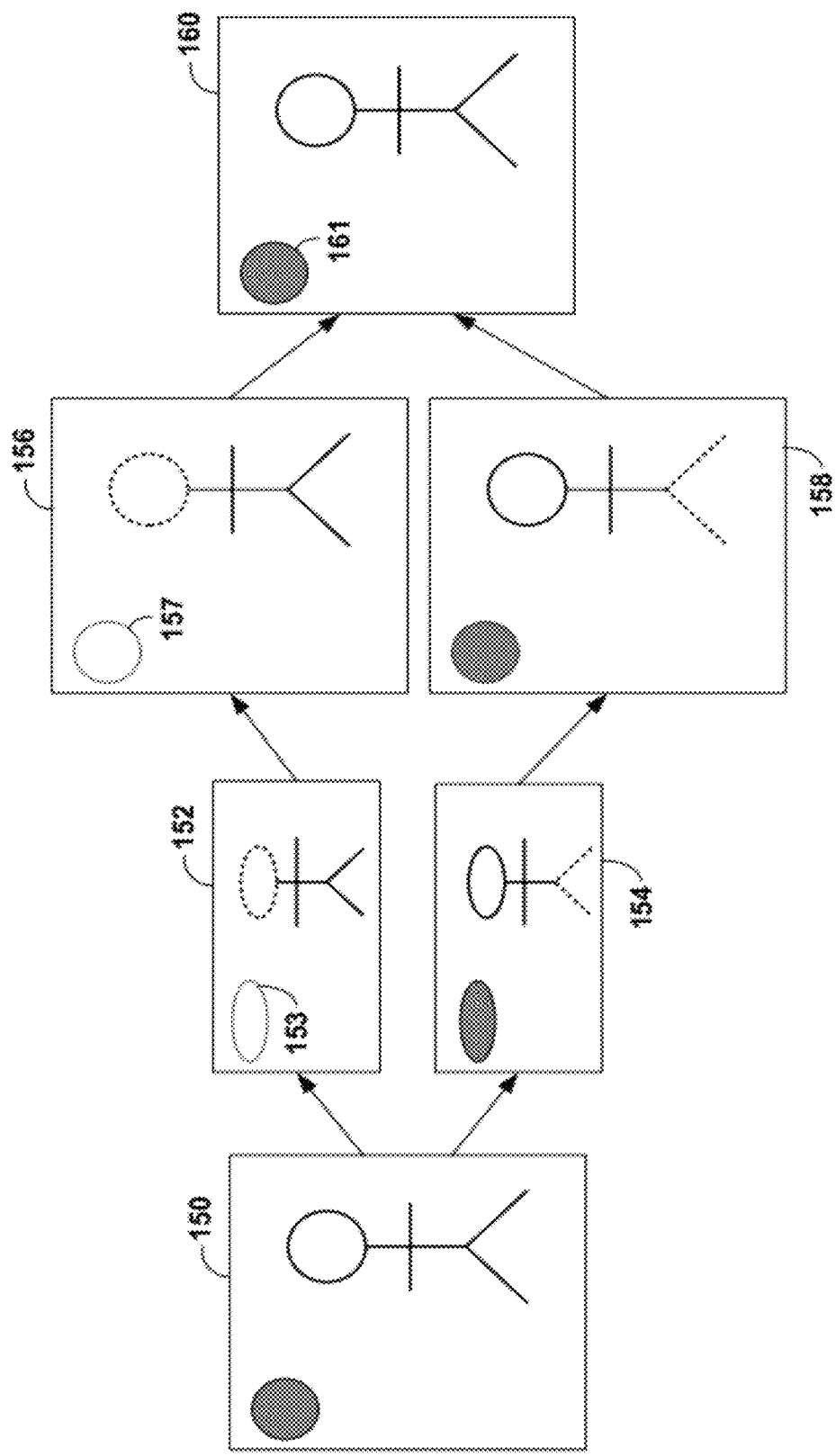
FIG. 6 depicts a conceptual diagram illustrating the combination of short and long exposure time samples from even and odd-numbered lines in accordance with the techniques of this disclosure.

FIG. 6 depicts a conceptual diagram illustrating the combination of short and long exposure time samples from even and odd-numbered lines using the techniques described above. The image depicted at 150 in FIG. 6 illustrates the sensor frame plane with even and odd-numbered line and short and long exposure time control. Long exposure time, e.g., second exposure time, samples are collected for the odd-numbered lines and are depicted at 152. The long exposure time has caused pixel cells at 153 to become saturated.

Short exposure time, e.g., first exposure time, samples are collected for the even numbers and are depicted at 154. Next, the samples collected for the odd and even-numbered lines are upsampled. The long exposure time samples from the odd-numbered lines are upsampled to a desired frame size, shown at 156, although the pixel cells at 157 remain saturated. The short exposure time samples from the even-numbered lines are upsampled to a desired frame size, shown at 158. Finally, using the combination techniques described throughout this disclosure, second exposure time image 156 and first exposure time image are combined to produce a full resolution image, shown at 160. In the combined image 160, the pixel cells at 161 are no longer saturated.

The two images may be combined on-sensor or off-sensor via an external processor. Generally speaking, the main difference between combining on-sensor or off-sensor is the amount of additional memory that is needed. Combining on the sensor may allow for faster read out of the samples, thereby reducing latency. In addition, combining on the sensor may allow for reduced data transfers, e.g., reduced bandwidth. For example, if the combination is not performed on the sensor, two frames may need to be read out from the sensor, e.g., a short exposure time frame and a long exposure time frame. In order to keep the same frame rate, e.g., for video applications, the data rate must be doubled in order to accommodate the read outs of the two frames. However, if the combination is performed on the sensor, the long exposure time frame and short exposure time frame are combined and read out within one frame duration.

For example, in the implementation described above in which the even-numbered lines of a pixel cell array are exposed at a first exposure time and the odd-numbered lines of the pixel cell array may be exposed at a second exposure time different from the first exposure time, the combination of the long exposure time sample and the short exposure time sample may be performed on-sensor. In order to combine the samples on-sensor, extra memory, e.g., a line buffer, may be necessary. In such an implementation, an entire even line may be read out at the short exposure time, converted via an A/D converter, and stored in memory. Then, the entire odd line may be read out at the long exposure time and converted via an A/D converter. A processor may retrieve the value from memory for the even line, combine with the converted values for the odd line using the combining techniques described in this disclosure, and then output a single, combined image. Again, using such an on-sensor scheme may reduce the bandwidth needed for the imaging processing pipeline, at the expense of additional memory requirements.

The implementation shown in FIG. 1 was described above with respect to on-sensor combining. However, pixel cell 10 of FIG. 1 may also be used in a sensor, e.g., a CMOS sensor, that utilizes an off-sensor combining scheme. In an off-sensor combining scheme, the sensor may be reset in the manner described previously, and then the sensor may begin acquiring photons immediately. At a short exposure time, e.g., t=t/2, charge may be transferred to capacitor 20. In some examples, correlated double sampling may be used, as described above. Then, samples may be read using a rolling shutter technique. At a long exposure time, e.g., t=2t, charge may be transferred to capacitor 20 (the previous value from t=t/2 has already been read out). When all the values from the short exposure time have been read out, correlated double sampling may be performed again. Then, the values from the long exposure time may be read out. The images from the short exposure time (t=0 to t=t/2) may then be combined using the techniques of this disclosure off-sensor with the images from the long exposure time (t=0 to t=2t).

As mentioned above, the signal combining techniques described in this disclosure are applicable to image sensors other than CMOS sensors, such as CCD image sensors. A CCD image sensor may be used in another example imaging technique to produce an HDR image. In one example, a mechanical shutter may be added to the CCD sensor. At a first time, e.g., t=0, the mechanical shutter may be opened and the sensor may begin acquiring photons immediately. At a second time temporally subsequent to the first time, e.g., t=t/2, charge, or first sample, is transferred to temporary storage region, e.g., a shielded region that may store a copy of the pixel cell. Reading of the image from time t=t/2 may begin while integration, i.e., exposure to light, continues. At a third time, e.g., t=2t, the mechanical shutter is closed. When the image from time t=t/2 is completely read out from the temporary storage, the charge, or second sample, stored on the pixel cell from time t=2t may be transferred to the temporary storage and then read out. After reading out the second sample from time t=2t, processor 76 may apply a weighting factor M(i, j) to the second sample. Then, processor 76 may combine the weighted second sample to the first sample from time t=t/2 to produce a HDR image.

Figure 7:
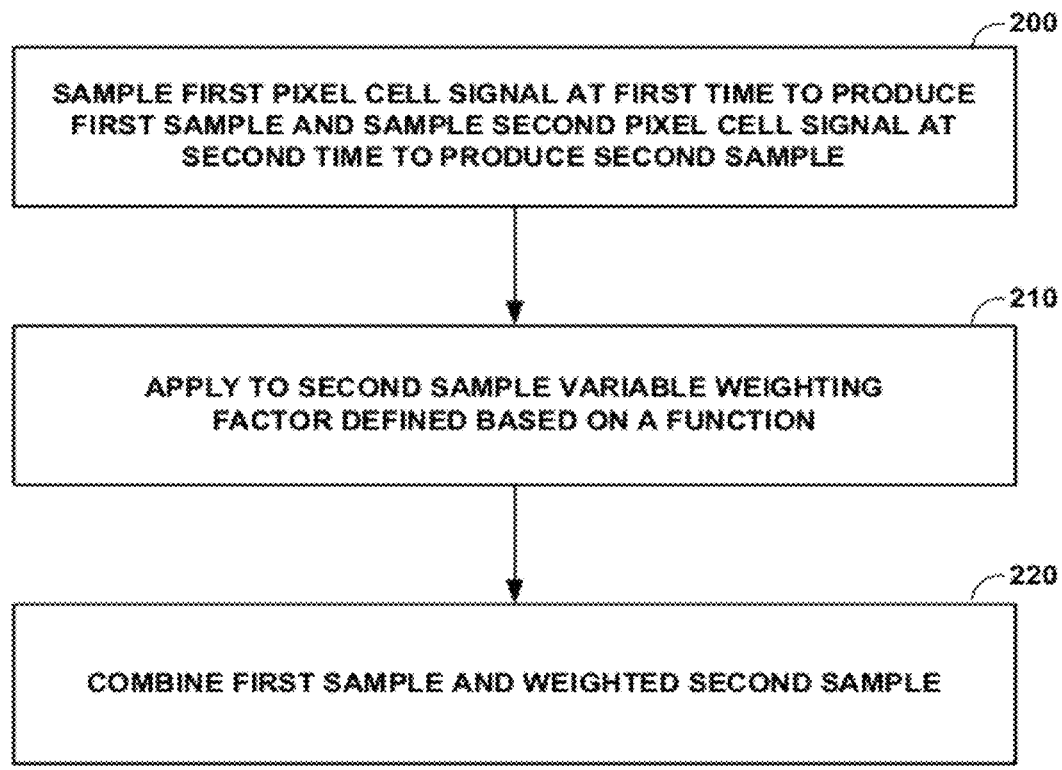
FIG. 7 is a flow diagram illustrating an example method that may be used to implement the techniques of this disclosure.

FIG. 7 is a flow diagram illustrating an example method that may be used to implement the techniques of this disclosure. Controller 54 of FIG. 3, for example, samples a first pixel cell signal at a first time, e.g., a short exposure time, to produce a first sample, e.g., $S_{SHORT}(i, j)$, (200). Controller 54 also samples a second pixel cell signal at a second time, e.g., a long exposure time, to produce a second sample, e.g., $S_{LONG}(i, j)$ (200). In some examples, the second time is temporally subsequent to the first time. In another example, the first pixel cell signal and the second pixel cell signal are produced by one of a complimentary MOS (CMOS) image sensor and a charge-coupled device (CCD) image sensor.

Processor 76 of FIG. 3, for example, may apply a variable weighting factor, e.g., M(i, j), to the second sample, wherein the variable weighting factor is defined by a function, e.g., a combining curve C ( ) at the second sample, e.g., $S_{LONG}(i, j)$ (210). In one example, the value of M(i, j) is between zero and one, inclusive. In one example, the variable weighting factor M(i, j)=C(L) and is defined by the following:

$$C(L) = \begin{cases} 1 & \text{if } L < T - \Delta \\ (1 - e^{K(L-T)/\Delta})/2 + 0.5 & \text{if } T - \Delta \le L < T \\ (e^{K(T-L)/\Delta})/2 & \text{if } T \le L \le T + \Delta \\ 0 & \text{if } L > T + \Delta \end{cases}$$

where L, T, K, and $\Delta$ are described above with respect to equation (4).

Processor 76, for example, then combines the first sample and the weighted second sample to produce an HDR image (220). In one example, combining the first sample and the weighted second sample comprises combining the first sample and the weighted second sample on the image sensor, e.g., image sensor 50.

In some examples, the method shown in FIG. 7 includes combining the first sample and the weighted second sample according to the equation $S_{COMBINED}(i, j) = S_{LONG}(i, j)*M(i, j) + n*S_{SHORT}(i, j)*(1-M(i, j))$, where $S_{COMBINED}$ denotes the combination of the first sample, denoted by $S_{SHORT}$, and the second sample, denoted by $S_{LONG}$, for the pixel cell located at (i, j), n denotes a scalar value that is dependent on the difference in the time of exposure between the first time and the second time, and M(i, j) denotes the variable weighting factor.

Figure 8:
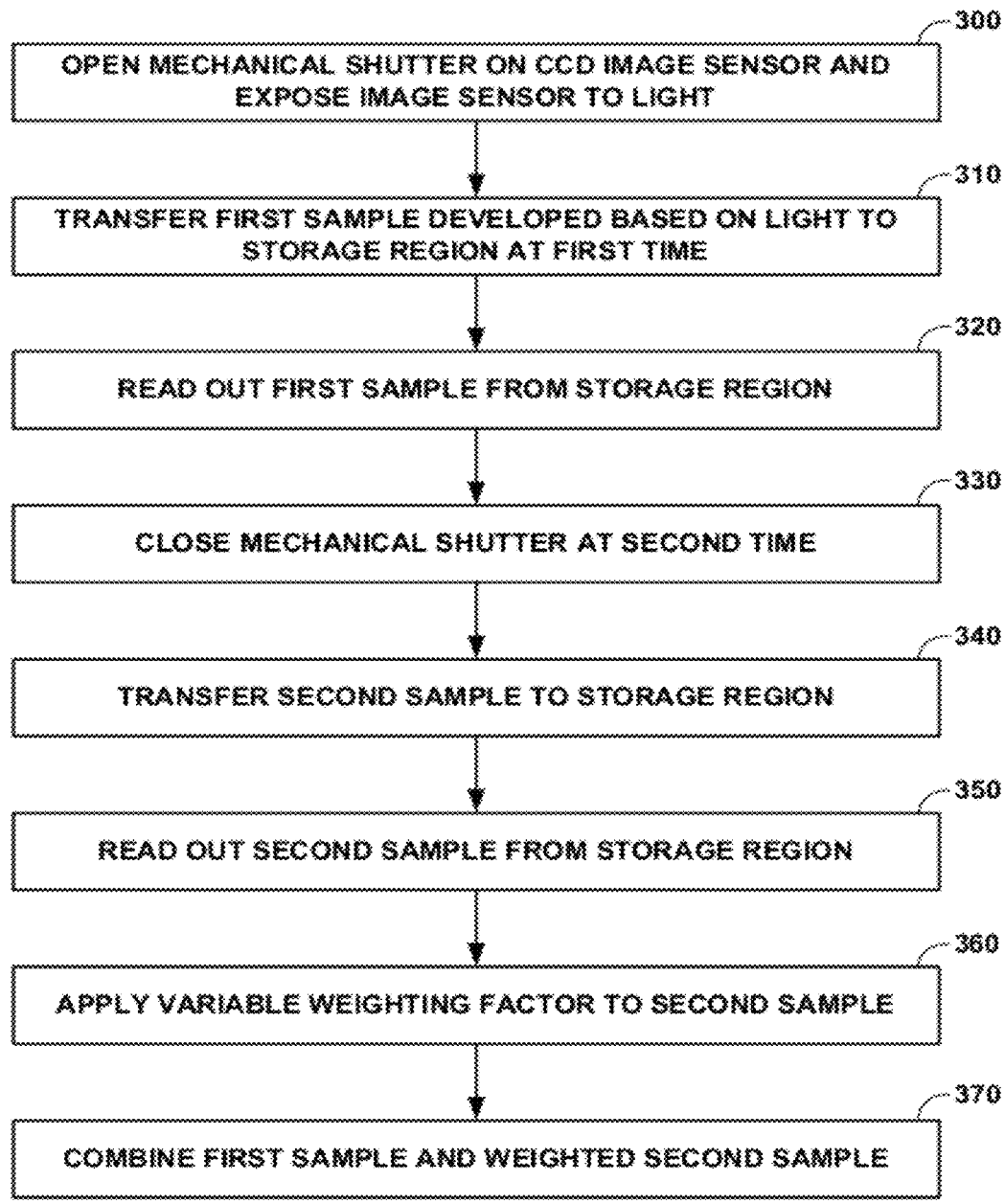
FIG. 8 is a flow diagram illustrating another example method that may be used to implement the techniques of this disclosure.

FIG. 8 is a flow diagram illustrating another example method that may be used to implement the techniques of this disclosure. The method of FIG. 8 may be used, for example, with a CCD image sensor. In FIG. 8, a controller opens a mechanical shutter on a CCD image sensor, exposing the image sensor to light (300). The controller transfers a first sample developed based on the light to a storage region at a first time (310), and then reads out the first sample from the storage region (320). At a second time temporally subsequent to the first time, the controller closes the mechanical shutter (330), and a second sample may be transferred to the storage region (340). The controller may then read out the second sample from the storage region (350). A processor applies a variable weighting factor, e.g., M(i, j), to the second sample (360). The processor then combines the first sample and the second weighted sample (370), e.g., by processor 76 to produce a HDR image.

Figure 9:
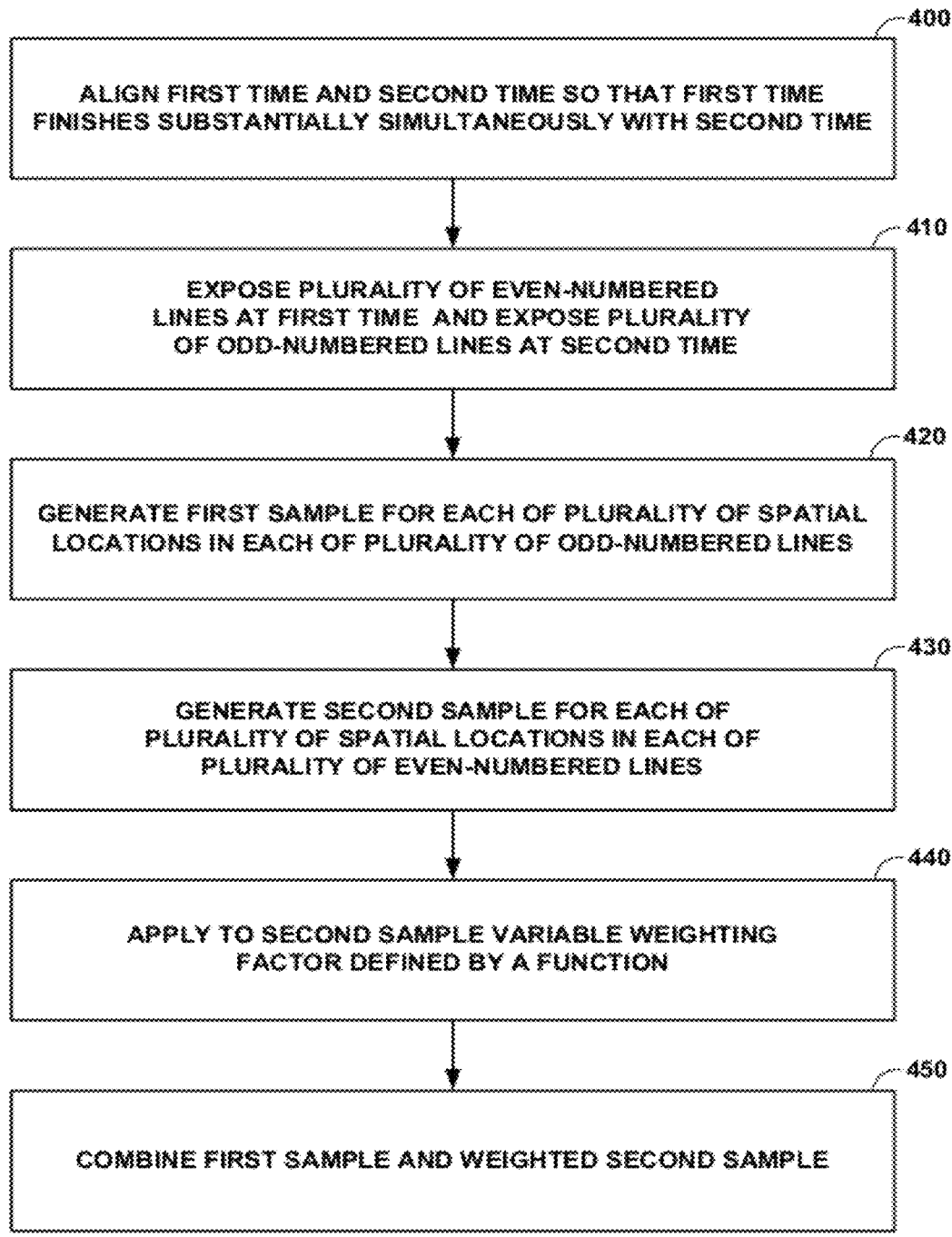
FIG. 9 is a flow diagram illustrating another example method that may be used to implement the techniques of this disclosure.

FIG. 9 is a flow diagram illustrating another example method that may be used to implement the techniques of this disclosure. The method of FIG. 9 may be used, for example, with a CMOS image sensor. In FIG. 9, controller 54 of FIG. 3 may align a first exposure time and a second exposure time so that the first exposure time finishes substantially simultaneously with the second exposure time (400). Controller 54 may expose a plurality of even-numbered lines of the CMOS image sensor at the first time to produce a first sample for each of a plurality of spatial locations in each of the plurality of even-numbered lines, and may expose a plurality of odd-numbered lines of the CMOS image sensor at the second time to produce the second sample for each of a plurality of spatial locations in each of the plurality of odd-numbered lines (410). Processor 76, for example, generates the first sample for each of the plurality of spatial locations in each of the plurality of odd-numbered lines by one of downsampling and upsampling the first sample for each of a plurality of spatial locations in each of the plurality of even-numbered lines (420). Processor 76, for example, generates the second sample for each of the plurality of spatial locations in each of the plurality of even-numbered lines by one of downsampling and upsampling the second sample for each of a plurality of spatial locations in each of the plurality of odd-numbered lines (430). Processor 76 applies a variable weighting factor, e.g., M(i, j), to the second sample (440). Processor 76 then combines the first sample and the second weighted sample to produce a HDR image (450).

Figure 10:
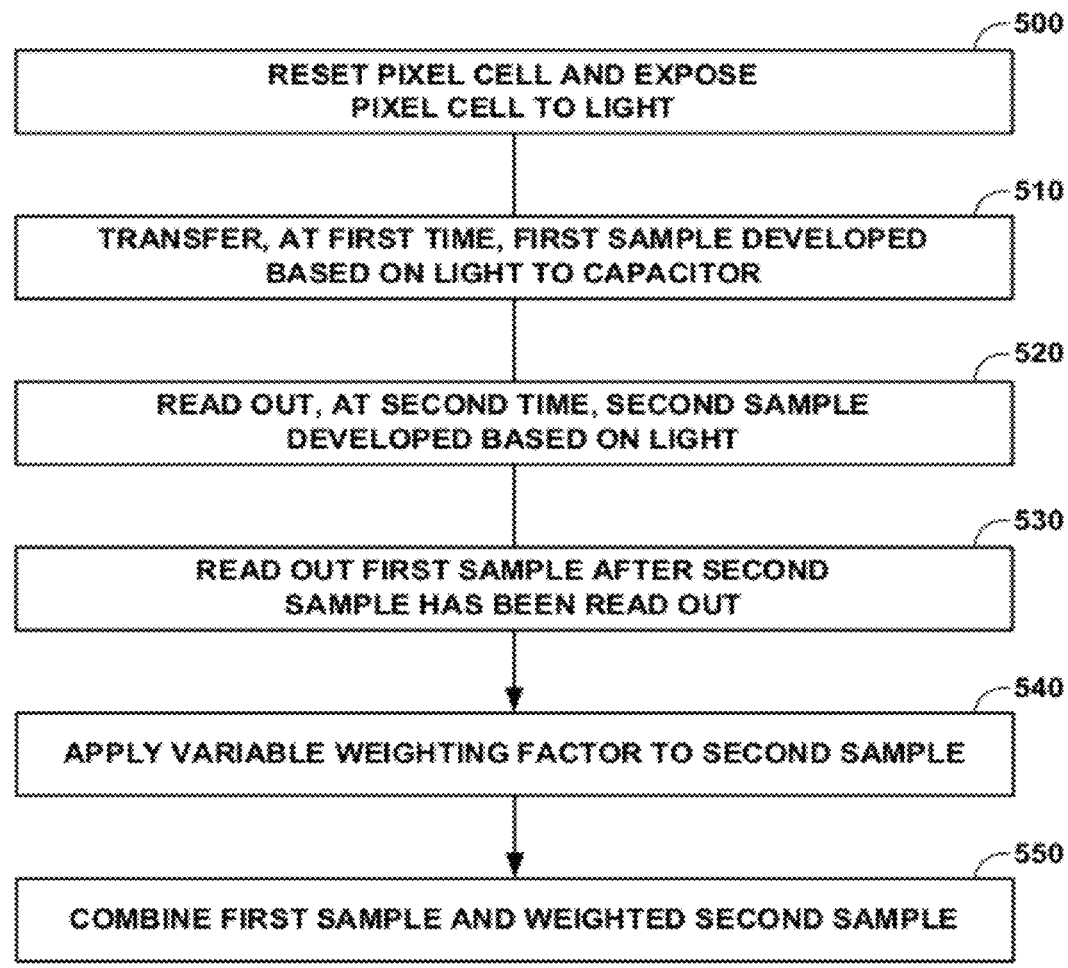
FIG. 10 is a flow diagram illustrating another example method that may be used to implement the techniques of this disclosure.

FIG. 10 is a flow diagram illustrating another example method that may be used to implement the techniques of this disclosure. The method of FIG. 10 may be used, for example, with a CMOS image sensor. In FIG. 10, controller 54 of FIG. 3, for example, may reset a photosensitive semiconductor, e.g., photosensitive semiconductor 12, and expose the photosensitive semiconductor to light 54 (500). At a first time, controller 54 may transfer a first sample developed based on the light to a capacitor (510), e.g., capacitor 20 of FIG. 1. At a second time, controller 54 may read out a second sample developed based on the light from the photosensitive semiconductor (520). Controller 54 may read out the first sample after controller 54 reads out the second sample (530). Processor 76, for example, may apply a variable weighting factor, e.g., M(i, j), to the second sample (540). Processor 76 may combine the first sample and the second weighted sample to produce a HDR image (550).

The techniques described in this disclosure may be implemented, at least in part, in hardware, software, firmware or any combination thereof. For example, various aspects of the described techniques may be implemented within one or more processors, including one or more microprocessors, digital signal processors (DSPs), network processors (NPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate computing hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples of the disclosure have been described. These and other examples are within the scope of the following claims.

The invention claimed is:
1. A method comprising:
sampling a first pixel cell signal at a first time to produce a first sample;
sampling a second pixel cell signal at a second time to produce a second sample;
applying a first variable weighting factor to the first sample, wherein the first variable weighting factor is defined based on a first function;
applying a second variable weighting factor to the second sample, wherein the second variable weighting factor is defined based on a second function; and
combining the weighted first sample and the weighted second sample according to the equation:

$$S_{COMBINED}(i,j) = S_{LONG}(i,j)*M(i,j) + n*S_{SHORT}(i,j)*(1-M(i,j))$$

where $S_{COMBINED}$ denotes the combination of the first sample, denoted by $S_{SHORT}$, and the second sample, denoted by $S_{LONG}$, for the pixel cell located at (i, j), n denotes a scalar value that is dependent on the difference in the time of exposure between the first time and the second time, and M(i, j) denotes the variable weighting factor.

2. The method of claim 1, wherein the value of M(i, j) is between zero and one, inclusive.

3. The method of claim 1, wherein the second time is temporally subsequent to the first time.

4. The method of claim 1, wherein combining the weighted first sample and the weighted second sample comprises combining the weighted first sample and the weighted second sample on a sensor.

5. The method of claim 1, wherein the first pixel cell signal and the second pixel cell signal are produced by one of a complementary MOS (CMOS) image sensor and a charge-coupled device (CCD) image sensor.

6. The method of claim 5, wherein sampling a first pixel cell signal at a first time to produce a first sample and sampling a second pixel cell signal at a second time to produce a second sample comprises:
opening a mechanical shutter on a CCD image sensor and exposing the image sensor to light;
transferring a first sample developed based on the light to a storage region at a first time;
reading out the first sample from the storage region;
closing the mechanical shutter at a second time, the second time being temporally subsequent to the first time;
transferring a second sample to the storage region; and
reading out the second sample from the storage region.

7. The method of claim 5, wherein sampling a first pixel cell signal at a first time to produce a first sample and sampling a second pixel cell signal at a second time to produce a second sample comprises:
aligning the first time and the second time so that the first time finishes substantially simultaneously with the second time;
exposing a plurality of even-numbered lines of the CMOS image sensor at the first time to produce the first sample for each of a plurality of spatial locations in each of the plurality of even-numbered lines and exposing a plurality of odd-numbered lines of the CMOS image sensor at the second time to produce the second sample for each of a plurality of spatial locations in each of the plurality of odd-numbered lines;
generating the first sample for each of the plurality of spatial locations in each of the plurality of odd-numbered lines by one of downsampling and upsampling the first sample for each of a plurality of spatial locations in each of the plurality of even-numbered lines; and
generating the second sample for each of the plurality of spatial locations in each of the plurality of even-numbered lines by one of downsampling and upsampling the second sample for each of a plurality of spatial locations in each of the plurality of odd-numbered lines.

8. The method of claim 5, wherein sampling a first pixel cell signal at a first time to produce a first sample and sampling a second pixel cell signal at a second time to produce a second sample comprises:
resetting a pixel cell and exposing the pixel cell to light;
transferring, at a first time, a first sample developed based on the light to a capacitor;
reading out, at a second time, a second sample developed based on the light; and
reading out the first sample after the second sample has been read out.

9. A system comprising:
an image sensor comprising:
a plurality of pixel cells; and
a controller that:
samples, from at least one of the plurality of pixel cells, a first pixel cell signal at a first time to produce a first sample; and samples, from the at least one of the plurality of cells, a second pixel cell signal at a second time to produce a second sample; and
a processor that:
applies a first variable weighting factor to the first sample, wherein the first variable weighting factor is defined based on a first function;
applies a second variable weighting factor to the second sample, wherein the second variable weighting factor is defined based on a second function; and
combines the weighted first sample and the weighted second sample according to the equation:

$$S_{COMBINED}(i,j) = S_{LONG}(i,j)*M(i,j) + n*S_{SHORT}(i,j)*(1-M(i,j))$$

where $S_{COMBINED}$ denotes the combination of the first sample, denoted by $S_{SHORT}$, and the second sample, denoted by $S_{LONG}$, for the pixel cell located at (i, j), n denotes a scalar value that is dependent on the difference in the time of exposure between the first time and the second time, and M(i, j) denotes the variable weighting factor.

10. The system of claim 9, wherein the value of M(i, j) is between zero and one, inclusive.

11. The system of claim 9, wherein the second time is temporally subsequent to the first time.

12. The system of claim 9, wherein the processor combines the weighted first sample and the weighted second sample on a sensor.

13. The system of claim 9, wherein the first pixel cell signal and the second pixel cell signal are produced by one of a complementary MOS (CMOS) image sensor and a charge-coupled device (CCD) image sensor.

14. The system of claim 13, wherein the controller samples a first pixel cell signal at a first time to produce a first sample and samples a second pixel cell signal at a second time to produce a second sample at least by:
opening a mechanical shutter on a CCD image sensor and exposing the image sensor to light;
transferring a first sample developed based on the light to a storage region at a first time;
reading out the first sample from the storage region;
closing the mechanical shutter at a second time, the second time being temporally subsequent to the first time;
transferring a second sample to the storage region; and
reading out the second sample from the storage region.

15. The system of claim 13, wherein the controller samples a first pixel cell signal at a first time to produce a first sample and samples a second pixel cell signal at a second time to produce a second sample at least by:
aligning the first time and the second time so that the first time finishes substantially simultaneously with the second time;
exposing a plurality of even-numbered lines of the CMOS image sensor at the first time to produce the first sample for each of a plurality of spatial locations in each of the plurality of even-numbered lines and exposing a plurality of odd-numbered lines of the CMOS image sensor at the second time to produce the second sample for each of a plurality of spatial locations in each of the plurality of odd-numbered lines;
generating the first sample for each of the plurality of spatial locations in each of the plurality of odd-numbered lines by one of downsampling and upsampling the first sample for each of a plurality of spatial locations in each of the plurality of even-numbered lines; and generating the second sample for each of the plurality of spatial locations in each of the plurality of even-numbered lines by one of downsampling and upsampling the second sample for each of a plurality of spatial locations in each of the plurality of odd-numbered lines.

16. The system of claim 13, wherein the controller samples a first pixel cell signal at a first time to produce a first sample and samples a second pixel cell signal at a second time to produce a second sample at least by:
resetting a pixel cell and exposing the pixel cell to light;
transferring, at a first time, a first sample developed based on the light to a capacitor;
reading out, at a second time, a second sample developed based on the light; and
reading out the first sample after the second sample has been read out.

17. A system comprising:
means for sampling a first pixel cell signal at a first time to produce a first sample;
means for sampling a second pixel cell signal at a second time to produce a second sample;
means for applying a first variable weighting factor to the first sample, wherein the first variable weighting factor is defined based on a first function;
means for applying a second variable weighting factor to the second sample, wherein the second variable weighting factor is defined based on a second function; and
means for combining the weighted first sample and the weighted second sample according to the equation:

$$S_{COMBINED}(i,j) = S_{LONG}(i,j)*M(i,j) + n*S_{SHORT}(i,j)*(1-M(i,j))$$

where $S_{COMBINED}$ denotes the combination of the first sample, denoted by $S_{SHORT}$, and the second sample, denoted by $S_{LONG}$, for the pixel cell located at (i, j), n denotes a scalar value that is dependent on the difference in the time of exposure between the first time and the second time, and M(i, j) denotes the variable weighting factor.

18. The system of claim 17, wherein the value of M(i, j) is between zero and one, inclusive.

19. The system of claim 17, wherein the second time is temporally subsequent to the first time.

20. The system of claim 17, wherein the means for combining the weighted first sample and the weighted second sample comprises means for combining the weighted first sample and the weighted second sample on a sensor.

21. The system of claim 17, wherein the first pixel cell signal and the second pixel cell signal are produced by one of a complementary MOS (CMOS) image sensor and a charge-coupled device (CCD) image sensor.

22. The system of claim 21, wherein the means for sampling a first pixel cell signal at a first time to produce a first sample and the means for sampling a second pixel cell signal at a second time to produce a second sample comprises:
means for opening a mechanical shutter on a CCD image sensor and exposing the image sensor to light;
means for transferring a first sample developed based on the light to a storage region at a first time;
means for reading out the first sample from the storage region;
means for closing the mechanical shutter at a second time, the second time being temporally subsequent to the first time;
means for transferring a second sample to the storage region; and
means for reading out the second sample from the storage region.

23. The system of claim 21, wherein the means for sampling a first pixel cell signal at a first time to produce a first sample and the means for sampling a second pixel cell signal at a second time to produce a second sample comprises:
means for aligning the first time and the second time so that the first time finishes substantially simultaneously with the second time;
means for exposing a plurality of even-numbered lines of the CMOS image sensor at the first time to produce the first sample for each of a plurality of spatial locations in each of the plurality of even-numbered lines and exposing a plurality of odd-numbered lines of the CMOS image sensor at the second time to produce the second sample for each of a plurality of spatial locations in each of the plurality of odd-numbered lines;
means for generating the first sample for each of the plurality of spatial locations in each of the plurality of odd-numbered lines by one of downsampling and upsampling the first sample for each of a plurality of spatial locations in each of the plurality of even-numbered lines; and
means for generating the second sample for each of the plurality of spatial locations in each of the plurality of even-numbered lines by one of downsampling and upsampling the second sample for each of a plurality of spatial locations in each of the plurality of odd-numbered lines.

24. The system of claim 21, wherein the means for sampling a first pixel cell signal at a first time to produce a first sample and the means for sampling a second pixel cell signal at a second time to produce a second sample comprises:
means for resetting a pixel cell and exposing the pixel cell to light;
means for transferring, at a first time, a first sample developed based on the light to a capacitor;
means for reading out, at a second time, a second sample developed based on the light; and
means for reading out the first sample after the second sample has been read out.

25. A computer-readable medium comprising instructions that, when executed by one or more processors, cause the one or more processors to:
sample a first pixel cell signal at a first time to produce a first sample;
sample a second pixel cell signal at a second time to produce a second sample;
apply a first variable weighting factor to the first sample, wherein the first variable weighting factor is defined based on a first function;
apply a second variable weighting factor to the second sample, wherein the second variable weighting factor is defined based on a second function; and
combine the first sample and the weighted second sample according to the equation:

$$S_{COMBINED}(i,j) = S_{LONG}(i,j)*M(i,j) + n*S_{SHORT}(i,j)*(1-M(i,j))$$

where $S_{COMBINED}$ denotes the combination of the first sample, denoted by $S_{SHORT}$, and the second sample, denoted by $S_{LONG}$, for the pixel cell located at (i, j), n denotes a scalar value that is dependent on the difference in the time of exposure between the first time and the second time, and M(i, j) denotes the variable weighting factor.

26. The computer-readable medium of claim 25, wherein the value of M(i, j) is between zero and one, inclusive.

27. The computer-readable medium of claim 25, wherein the second time is temporally subsequent to the first time.

28. The computer-readable medium of claim 25, wherein the instructions that cause the one or more processors to combine the weighted first sample and the weighted second sample comprise instructions that cause the one or more processors to combine the weighted first sample and the weighted second sample on a sensor.

29. The computer-readable medium of claim 25, wherein the first pixel cell signal and the second pixel cell signal are produced by one of a complementary MOS (CMOS) image sensor and a charge-coupled device (CCD) image sensor.

30. The computer-readable medium of claim 29, wherein the instructions that cause the one or more processors to sample a first pixel cell signal at a first time to produce a first sample and sample a second pixel cell signal at a second time to produce a second sample comprise instructions that cause the one or more processors to:

open a mechanical shutter on a CCD image sensor and expose the image sensor to light;

transfer a first sample developed based on the light to a storage region at a first time;

read out the first sample from the storage region;

close the mechanical shutter at a second time, the second time being temporally subsequent to the first time;

transfer a second sample to the storage region; and read out the second sample from the storage region.

31. The computer-readable medium of claim 30, wherein the instructions that cause the one or more processors to sample a first pixel cell signal at a first time to produce a first sample and sample a second pixel cell signal at a second time to produce a second sample comprise instructions that cause the one or more processors to:

align the first time and the second time so that the first time finishes substantially simultaneously with the second time;

expose a plurality of even-numbered lines of the CMOS image sensor at the first time to produce the first sample for each of a plurality of spatial locations in each of the plurality of even-numbered lines and expose a plurality of odd-numbered lines of the CMOS image sensor at the second time to produce the second sample for each of a plurality of spatial locations in each of the plurality of odd-numbered lines;

generate the first sample for each of the plurality of spatial locations in each of the plurality of odd-numbered lines by one of downsampling and upsampling the first sample for each of a plurality of spatial locations in each of the plurality of even-numbered lines; and generate the second sample for each of the plurality of spatial locations in each of the plurality of even-numbered lines by one of downsampling and upsampling the second sample for each of a plurality of spatial locations in each of the plurality of odd-numbered lines.

32. The computer-readable medium of claim 30, wherein the instructions that cause the one or more processors to sample a first pixel cell signal at a first time to produce a first sample and sample a second pixel cell signal at a second time to produce a second sample comprise instructions that cause the one or more processors to:

reset a pixel cell and expose the pixel cell to light;

transfer, at a first time, a first sample developed based on the light to a capacitor;

read out, at a second time, a second sample developed based on the light; and read out the first sample after the second sample has been read out.

* * * * *